United States Patent [19]
Jurgens et al.

[11] 3,993,368
[45] Nov. 23, 1976

[54] TOOL JOINT WEAR PROTECTORS

[75] Inventors: Rainer Jürgens; Gerhard Exner, both of Celle, Germany

[73] Assignee: Christensen Diamond Products Company, Salt Lake City, Utah

[22] Filed: July 21, 1975

[21] Appl. No.: 597,478

[52] U.S. Cl. .............................................. 308/4 A
[51] Int. Cl.² ...................................... F16C 29/00
[58] Field of Search ............. 308/4 A; 175/323, 325; 166/241; 285/333

[56] References Cited
UNITED STATES PATENTS

| | | | |
|---|---|---|---|
| 2,334,350 | 11/1943 | Neuhaus | 308/4 A |
| 2,985,492 | 5/1961 | Bonney et al. | 308/4 A |
| 3,054,647 | 9/1962 | Rosenberg | 308/4 A |
| 3,074,767 | 1/1963 | Rosenberg | 308/4 A |

Primary Examiner—M. H. Wood, Jr.
Assistant Examiner—Gene A. Church
Attorney, Agent, or Firm—Subkow & Kriegel

[57] ABSTRACT

A tool joint for well drilling pipe includes a body having a wear protector including a split ring disposed in an annular groove in the tool joint body, the ring segments being welded together and to the groove portion of the body. Hardmetal elements secured in the outer periphery of the ring are irregularly distributed, with the distribution or density of the hardmetal elements being greatest adjacent to the end of the tool joint body and progressively less inwardly from the end of the tool joint body.

26 Claims, 13 Drawing Figures

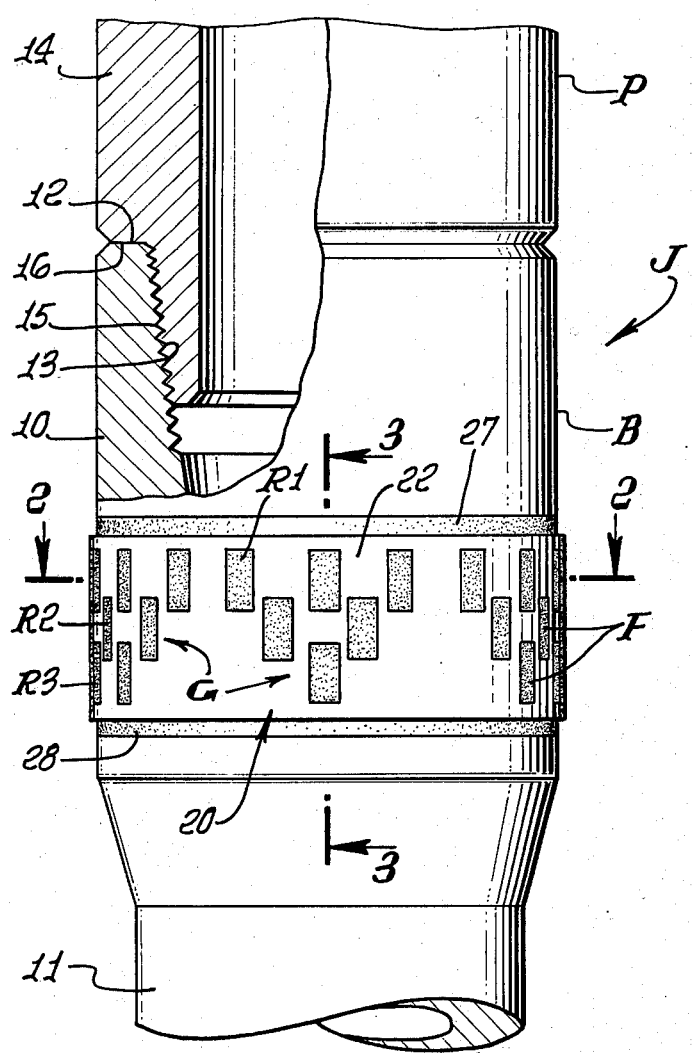
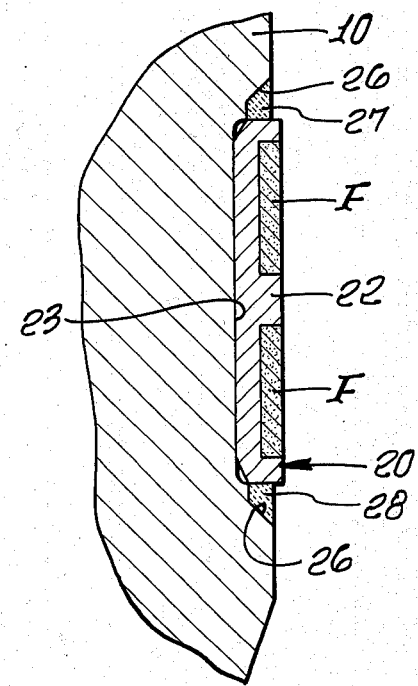
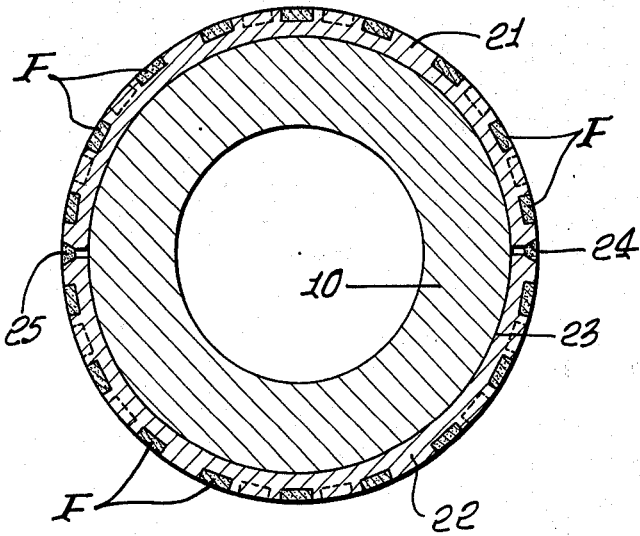
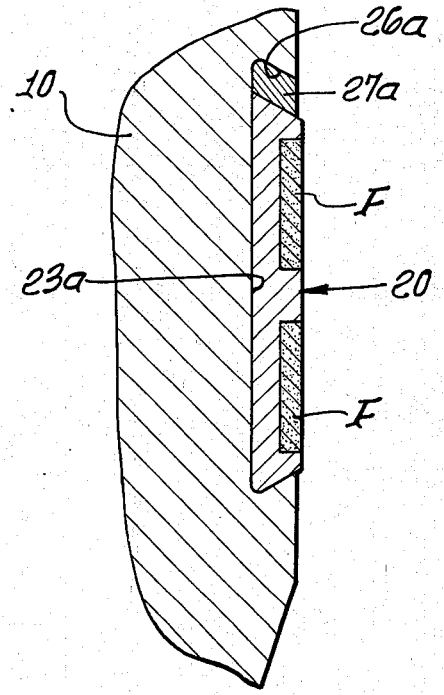

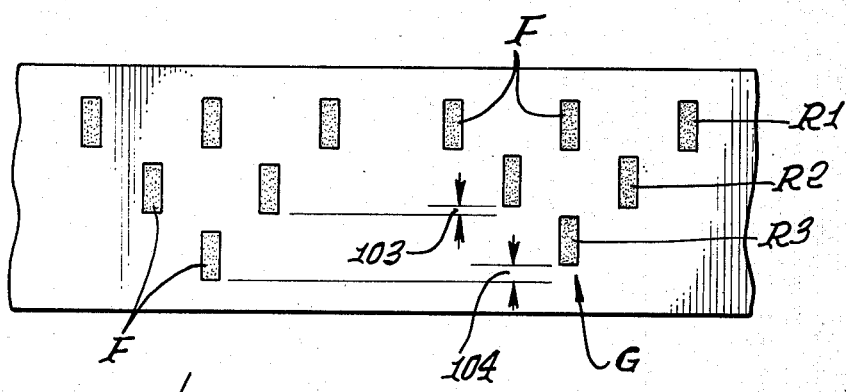
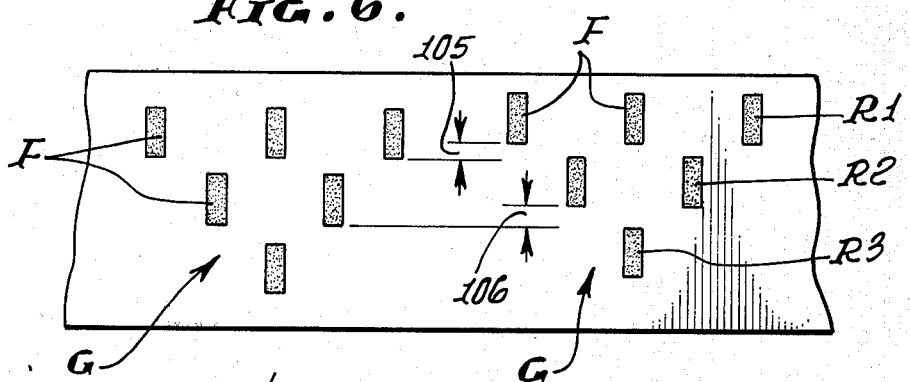
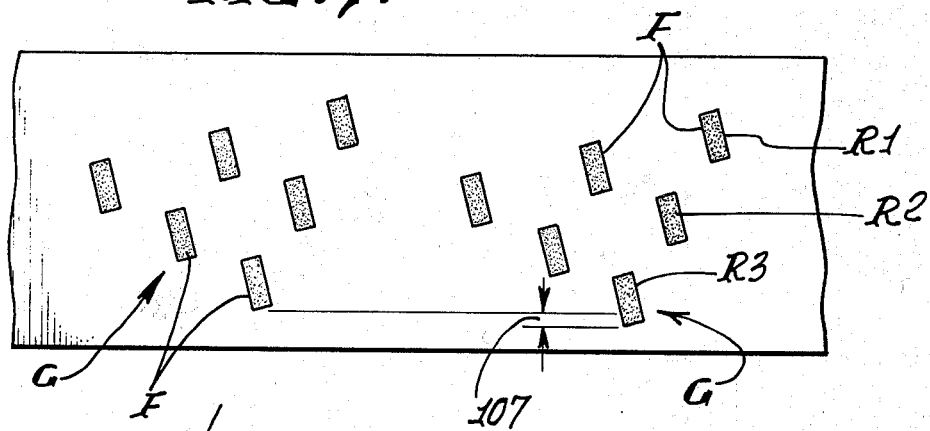
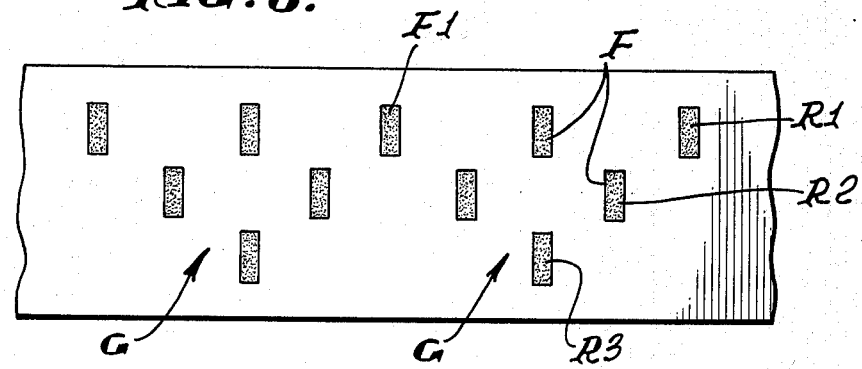

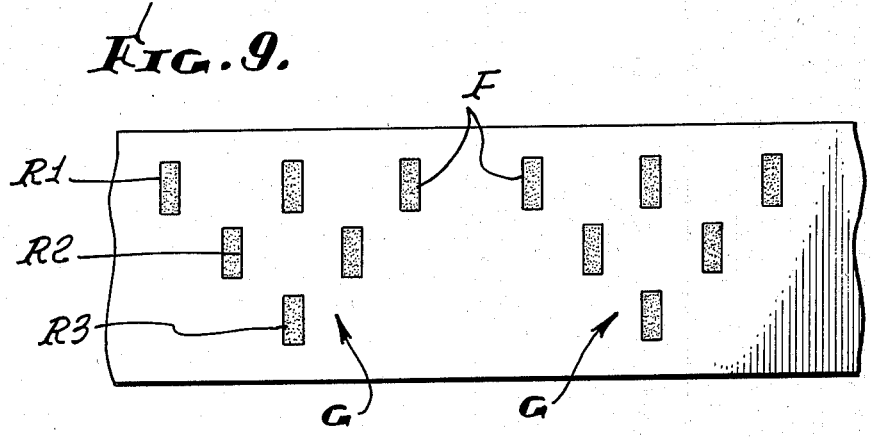
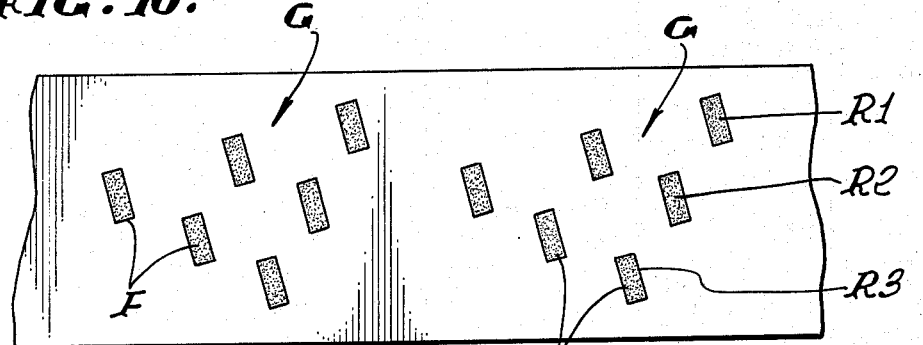
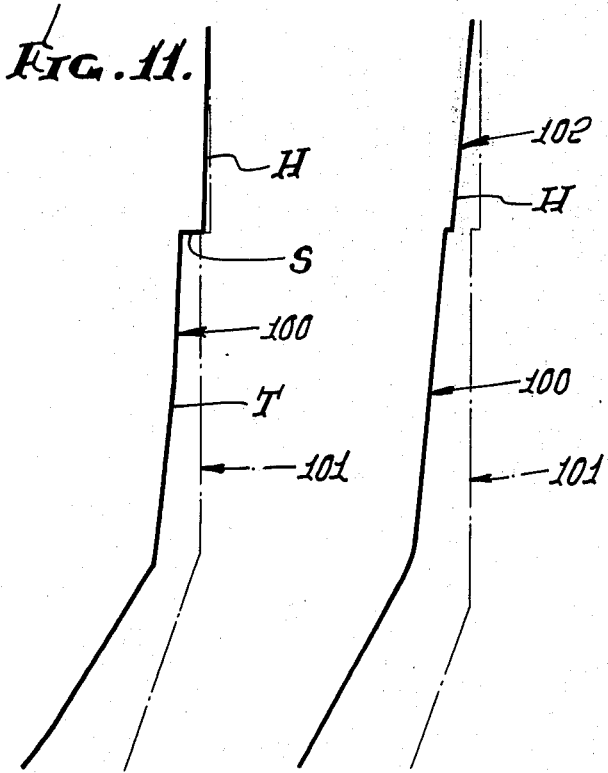
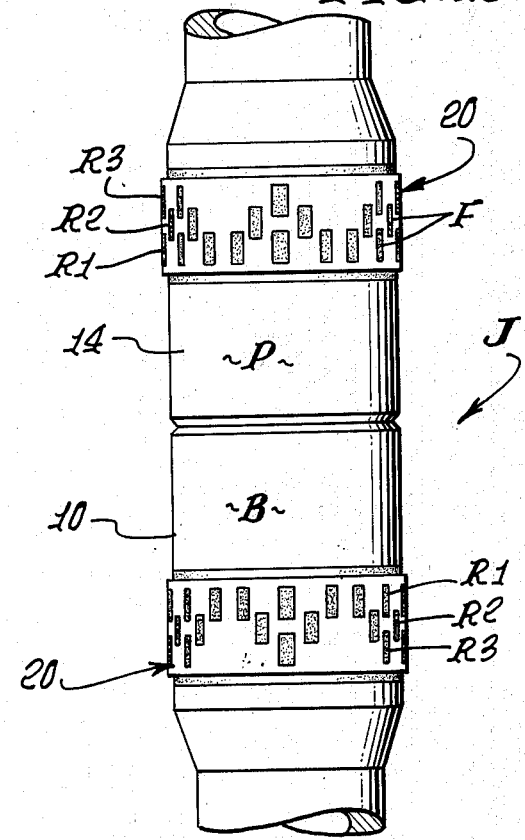

TOOL JOINT WEAR PROTECTORS

In the drilling of wells, such as oil and gas wells, by the rotary method, a string of drill pipe, which is made up of lengths or stands joined together by threaded tool joints, is rotated and periodically moved longitudinally in the well bore, causing well-recognized, long-standing problems of tool joint wear and casing damage. The problmes result from contact between the tool joints and the abrasive subsurface earth formation, as well as contact between the tool joints and the casing where the well bore is cased. With the advent of directional or slant hole drilling, particulary when the well is drilled at large angles relative to the vertical, the problems have been accentuated.

As a result, much effort has been devoted to providing protection for the tool joints of the drill string, including the tool joints of drill pipe and drill collars, by the application of various hardfacing materials or hardmetal, such as tungsten carbide, to the tool joints, and in some cases to intermediate portions of the drill pipe. Efforts have been made to protect the well casing against wear by utilizing devices, such as elastomer sleeves, applied to the drill pipe to hold the drill pipe away from the casing.

The drill pipe employed on well drilling rigs constitutes one of the highest cost items in drilling rig operations due to the wear of the drill pipe, in terms of original and maintenance costs. Since tool joint wear is excessive in the absence of hardfacing material, the use of the hardfacing material has become more or less universal. However, the application of hardfacing material to the tool joints in the manners heretofore employed customarily has created other problems related to casing wear and damage, particularly when the drill string is manipulated longitudinally during round tripping of the drill string, both when the drill string is being run and pulled, and when the stands are being made up in and broken out of the drill string.

Typically, the hardfacing material has been applied to the tool joints, or to bands attached to the tool joints, in a variety of patterns, including vertically spaced annular bands and uniformly spaced or distributed slugs applied to or cast in recesses in the tool joint or the supporting bands for the hardfacing material. It has been found that such typical hardfacing patterns on the tool joints cause a wear problem involving the formation of abrupt shoulders on the tool joints which face downwardly, in the case of the lower part of each tool joint (usually the box part), which has a tendency to hang up in the annular gap at each casing coupling, as well as the tendency to cut or gouge the casing. The formation of the abrupt shoulder on the tool joint can be attributed to the fact that while the hardfacing material reduces the wear in the localized annular region of the tool joint, the adjacent annular region of the tool joint, which is not protected by hardfacing material, wears down, thereby forming the abrupt shoulder adjacent to the protected region.

The present invention provides improved tool joint wear protector means, the tool joint wearing in such manner that instead of forming an abrupt shoulder on the tool joint, the wear is on a uniform taper, any shoulder which may nevertheless be formed being relatively small, so that the tendency to hang up on the casing or to gouge and cut the casing is minimized.

More particularly, the present invention provides tool joint protection by applying hardfacing material to the tool joint in a non-uniform manner, in which the wear resistance is greatest in the annular region closest to the end surface of the joint which abuts with a companion joint, and is progressively less inwardly from the end of the tool joint, so that the protected region of the tool joint tends to wear in a longitudinally tapered form substantially corresponding to the tapered wear of the unprotected region of the tool joint.

In accomplishing the foregoing, the wear protection involves applying to the tool joints wear resistant elements or slugs of hardmetal or hardfacing material, such as tungsten carbide elements, which may be of selected size and shape, but which are so arranged with respect to the tool joints that the elements are more densely distributed in a region closest to the end of the joint and are less densely distributed in one or more regions further away from the end of the tool joint, so that the protection from wear progressively diminishes towards the unprotected region of the tool joint. The wear resistant elements, in accordance with several embodiments of the invention, may be arranged in various patterns or plots, including axially spaced rings or rows of diminishing number in which the number of elements may vary or be axially displaced within the rows to more or less lap with the elements in other rows. In addition, the elements may be skewed with respect to the axis of the tool joint or skewed and axially displaced with respect to other elements in the row.

This invention possesses many other advantages and has other purposes which may be made more clearly apparent from a consideration of the forms in which it may be embodied. These forms are shown in the drawings accompanying and forming part of the present specification. They will now be decribed in detail, for the purpose of illustrating the general principles of the invention; but it is to be understood that such detailed descriptions are not to be taken in a limiting sense.

Referring to the drawings:

FIG. 1 is a fragmentary view, partly in elevation and partly in longitudinal section, showing a tool joint with protector means in accordance with one form of the invention, including hardfacing elements arranged in one plot or manner;

FIG. 2 is a cross-section taken on the line 2—2 of FIG 1;

FIG. 3 is an enlarged, fragmentary vertical section taken on the line 3—3 of FIG. 1;

FIG. 4 is a view corresponding to FIG. 3, but showing a modified form;

FIG. 5 is a planar projection of a form of the protector means in which some of the hardfacing elements of adjacent plots are vertically displaced;

FIG. 6 is a planar projection of another form of the protector means in which the adjacent plots of hardfacing elements are vertically displaced;

FIG. 7 is a planar projection of a further form of the protector means in which the adjacent plots are skewed with respect to the axis of the tool joint and vertically displaced;

FIG. 8 is a planar projection of still another form of the protector means in which the adjacent plots of elements are spaced to form rows in which the elements in each row are uniformly spaced from each other;

FIG. 9 is a planar projection of yet another form of the protector means in which the elements are arranged in vertical plots in vertically spaced rows;

FIG. 10 is a planar projection of a still further form of the protector in which the elements are arranged in plots which are skewed with respect to the axis of the joint and equally spaced axially;

FIG. 11 is a diagrammatic showing of the wear and formation of a shoulder on a tool joint when the latter is protected in accordance with the prior art;

FIG. 12 is a diagrammatic showing of the wear and formation of the shoulder when the tool joint is protected in accordance with the invention; and FIG. 13 is an elevation showing a complete tool joint protected in accordance with the invention.

As seen in the drawings, referring first to FIGS. 1 through 3, a tool joint J comprises a "box" end B and a "pin" end P adapted to interconnect lengths of drill pipe or drill collars. The box end B includes a cylindrical joint body 10 suitably formed on or connected with the pipe 11. At its upper end, the body 10 has a radial end surface or shoulder 12 and an internal tapered bore provided with internal threads 13 adapted to receive the complementally tapered pin of the pin joint body 14, the tapered pin having thread 15 meshing with the thread 13 of the box end of the joint. At the lower end of the joint body 14 is a radial surface or shoulder 16 which abuts with the box shoulder 12 when the joint is made up.

Typically, the drill pipe used in well drilling operations is connected in the drill string by supporting the drill string in rotary table slips with the box end B facing upwardly to receive the pin end, which is stabbed into the box end and then rotated to make up the joint tightly with the shoulders 12 and 16 abutting each other.

In use, as is well known, as the drill string is rotated, with the tool joint J engaging the side of the bore hole, the earth formation, particularly sharp sands and rock, wear away the tool joint, unless it is protected against such wear. The abrasion of the earth is particularly damaging to the tool joint when the well is being drilled at an angle from the vertical, so that the drill string rests on the low side of the hole, or when the drill string is in tension or compression at a sharp bend or dog leg in the bore hole and the tool joint is forced against the formation during rotation of the drill string.

Prior efforts to avoid tool joint wear have mainly involved providing hardfacing material on the box end body 10 spaced downwardly from the upper end in the thickest wall section of the body. The hardfacing has consisted of rings or bands or slugs of hardmetal, such as tungsten carbide, in a binder metal sweat onto or cast into pockets in the joint body. Protective sleeves having wear resistant material have also been applied to the joint bodies. These prior protective means have resulted in reducing the wear of the tool joint bodies, but have also resulted in the tool joint bodies becoming worn in a manner such that the tool joint tends to hang up in casing couplings or tends to gouge and cut the casing. More specifically, it has been found that when hardfacing is applied to the tool joints in the conventional manners, the joint body, in the case of box end, wears below the annular region which is protected, forming an abrupt, annular shoulder facing downwardly. Such a shoulder is shown at S in FIG. 11 below the hardfaced zone H of the box end of the joint, diagrammatically shown by a full line 100 in FIG. 11, as compared with the unworn box end of the joint shown by a broken line 101. Beneath the shoulder S, the joint body wears to a substantially uniform taper T.

The present invention involves the concept of so arranging the hardfacing material in the protected region H that, as seen in FIG. 12, the protected region also wears to a tapered configuration 102 substantially like the tapered wear in the region T, when the joint body is worn down to the condition shown by a full line 102, 100 in FIG. 12, from the unworn condition shown by a broken line 101. Under these circumstances, there is no significant abrupt shoulder S formed by the wear, which can hang up in the gap at casing joints and/or cut or gouge the casing during rotation or reciprocation of the drill string.

Accordingly, as seen in FIGS. 1 through 3, a wear protective ring or band 20 is applied to the tool joint box body 10, the ring carrying hardfacing or hardmetal elements or slugs F therein for resisting abrasive wear of the ring, so that the least wear occurs at the upper end of the ring 20, closest to the upper end 12 of the box, the wear being progressively greater towards the lower end of the ring 20, whereby the ring wears on a taper, as shown at H in FIG. 12, generally corresponding to the tapered wear of the unprotected joint body, as at T.

The ring 20, as seen in FIG. 2, is formed on half-parts 21 and 22, which may be of a steel material, which fit into an annular groove 23 formed in the body 10, usually made of steel. The ends of the ring parts are bevelled at 24 to facilitate welding the half-parts together by end welds 25, after the half-parts have been placed in the groove 23. The groove 23 is axially extended above and below the ring to provide annular grooves 26 (FIG. 3), when the ring 20 is installed, adapted to receive annular top and bottom welds 27 and 28 which hold the ring against rotation, securely retained in the groove.

Another mode of assembly is shown in FIG. 4, wherein the groove 23a is undercut, top and bottom, and is of greater length than the ring 20. The ring half-parts are mounted in the groove and are then welded to each other, as at 24, 25. A strip of malleable metal 27a may be hammered into the groove at 26a to secure the ring downwardly in the undercut groove and prevent its upward movement therein. Suitable friction paste may be used between the inner surface of the ring and the base of the body groove to prevent relative rotation between the ring and body 10. Such friction paste may comprise particles of carborundum in a carrier, the particles binding between the opposing body and ring surfaces.

The invention, as seen in FIG. 1, involves an arrangement of hardfacing elements F of axially extended rectangular form which are arranged in groups or plots G which are repetitive circumferentially around the ring. These plots or groups are comprised of wear elements F providing an upper annular row R1 wherein the elements are uniformly spaced and aligned circumferentially of the ring 20. Beneath the row R1 is a middle row R2 of the elements F, and below the middle row is a lower row R3 of the elements F. Rows R2 and R3 are of diminishing number, so that each plot G essentially forms a triangle with its apex pointed downwardly. In this form, the rows of elements slightly overlap each other axially. It will be seen that with this arrangement the density of the distribution of the elements F is greatest at the upper portion of the ring 20, diminishing downwardly from row to row in such a way that the least wear occurs at the top row R1 and the greatest wear at the lower row R3. Thus, the wear pattern 102, 100, above described in connection with FIG. 12, will be produced.

Referring to FIGS. 5 through 10, other specific irregular patterns of the wear elements F are shown.

In FIG. 5, the rows of elements R2 and R3 are not circumferentially aligned. Instead, the elements of adjacent plots are axially displaced in rows R2 and R3, compared with the corresponding elements of the adjacent plot, as seen by the arrows 103, 104.

In FIG. 6, the arrangement of the elements F in each plot G is the same, but adjacent plots are axially displaced, as seen by the arrows 105, 106.

In FIG. 7, the arrangement of the elements F in each plot G is the same, but adjacent plots are axially displaced as indicated by the arrow 107, and the elements of each plot are skewed relative to the axis of the ring.

In FIG. 8, the plots G have their elements spaced in each row in such a manner that the elements F of each row are uniformly spaced. In this case, elements F1 of each plot are common to a pair of adjacent plots.

In FIG. 9, the elements of the rows R1, R2, R3 are all aligned circumferentially, but, as compared with FIG. 1, the rows of elements do not lap axially, but instead are axially spaced slightly.

In FIG. 10, the elements are skewed in each plot, but the plots are circumferentially aligned, instead of being axially displaced, as in FIG. 7.

While rectangular elements F are shown, it will be understood that other shapes are useful. Also, other arrangements of the hardfacing material may be used to accomplish the diminishing density of the distribution of the elements, to cause the regular tapered wear of the tool joint body.

As seen in FIG. 13, the pin end P of the joint may also be provided with irregularly arranged hardfacing elements F, in variable concentrations or densities, if desired, to modify the wear of the upper tool joint member P. The pattern of the elements F is reversely arranged with respect to the pattern of elements on the box B.

From the foregoing, it is now apparent that the invention provides a tool joint protector wherein, due to the progressively diminishing density or concentration of the hardfacing protection axially of the tool joint, the wear will uniformly conform to the tapered wear of the unprotected joint body, thereby preventing the formation of an abrupt shoulder S.

We claim:

1. In a well pipe tool joint part comprising an elongated body having thread means at one end of the body for connection with a complemental tool joint part, and wear protector means extending circumferentially about said body in an axially extended region spaced from the end of said one body: the improvement wherein said wear protector means comprises hardfacing material distributed about said region more densely closest to said one end of said body and progressively less densely towards the other end of said body.

2. In a well pipe tool joint part as defined in claim 1, said hardfacing material being in the form of slugs arranged in circumferentially spaced rows of diminishing number.

3. In a well pipe tool joint part as defined in claim 1, said hardfacing material being in the form of slugs arranged in triangular plots with the apex of each triangle pointing away from said one end of said body.

4. In a well pipe tool joint part as defined in clam 1, said hardfacing material being in the form of elongated elements extending axially of the body and arranged in plots forming rows of elements about said body in which the elements in each plot diminish in number from the row closest to said one end of said body.

5. In a well pipe tool joint part as defined in claim 4, said rows of elements slightly overlapping each other axially of said body.

6. In a well pipe tool joint part as defined in claim 4, the elements of each plot being uniformly circumferentially spaced in each row about said body.

7. In a well pipe tool joint part as defined in claim 4, the elements of adjacent plots being axially displaced with respect to the elements of adjacent plots in some of said rows.

8. In a well pipe tool joint part as defined in claim 4, the adjacent plots of elements being axially displaced with respect to one another.

9. In a well pipe tool joint part as defined in claim 4, said elements being skewed with respect to the axis of the body.

10. In a well pipe tool joint part as defined in claim 4, said elements being skewed with respect to the axis of the body and the plots of skewed elements being axially displaced with respect to one another.

11. In a well pipe tool joint part as defined in claim 1, supporting ring means for said hardfacing material, said body having an annular groove, said ring means being disposed in said groove, and means retaining said ring means in said groove.

12. In a well pipe tool joint part as defined in claim 11, said ring means being an axially split ring comprising ring segments, and said retaining means including welds interconnecting the segments of said ring.

13. In a well pipe tool joint part as defined in claim 11, said ring means being an axially split ring comprising ring segments, and said retaining means including welds interconnecting the segments of said ring, and welds extending circumferentially between said body and said ring segments to secure said ring to said body.

14. In a well pipe tool joint part as defined in claim 11, said groove in said body being undercut and being of greater axial dimension than said ring means, and said retaining means includes a malleable ring forced into said groove at an end of said ring means to hold said ring means in said groove.

15. A wear protective ring for well pipe tool joints comprising: a pair of ring half-parts adapted to be joined together in a groove of the tool joint, each half-part having wear protector means on its outer side comprising hardfacing material distributed more densely closest to one end of said half-part and progressively less densely toward the other end of said half-part.

16. A wear protective ring as defined in claim 15, said hardfacing material being in the form of slugs arranged in circumferentially spaced rows axially of said half-parts, the slugs in each row diminishing in number from one end portion of the half-parts toward the other end portion of the half-parts.

17. A wear protective ring as defined in claim 15, said hardfacing material being in the form of elongated elements extending axially of the body and arranged in plots forming rows of elements about each of said half-parts of diminishing numbers of elements from the row closest to said one end of said half-part.

18. A wear protective ring as defined in claim 17, the elements of adjacent plots being axially displaced with respect to the elements of adjacent plots in some of said rows.

19. A wear protective ring as defined in claim 17, the adjacent plots of elements being axially displaced with respect to one another.

20. A wear protective ring as defined in claim 17, the elements being skewed with respect to the axis of said half-part.

21. A wear protective ring for well pipe tool joints comprising: a plurality of ring parts adapted to be joined together in a groove of the tool joint, each ring part having wear protector means on its outer side comprising hardfacing material distributed more densely closest to one end of said ring part and progressively less densely toward the other end of said ring part.

22. A wear protective ring as defined in claim 21, said hardfacing material being in the form of slugs arranged in circumferentially spaced rows axially of said ring parts, the slugs in each row diminishing in number from one end portion of the ring parts toward the other end portion of the ring parts.

23. A wear protective ring as defined in claim 21, said hardfacing material being in the from of elongated elements extending axially of the body and arranged in plots forming rows of elements about each of said ring parts of diminishing numbers of elements from the row closest to said one end of said ring part.

24. A wear protective ring as defined in claim 23, the elements of adjacent plots being axially displaced with respect to the elements of adjacent plots in some of said rows.

25. A wear protective ring as defined in claim 23, the adjacent plots of elements being axially displaced with respect to one another.

26. A wear protective ring as defined in claim 23, the elements being skewed with respect to the axis of said ring part.

* * * * *